US012696827B2

(12) United States Patent
Coenen et al.

(10) Patent No.: US 12,696,827 B2
(45) Date of Patent: Aug. 4, 2026

(54) LOWER LINK HOOK

(71) Applicant: UNIPARTS INDIA LIMITED, New Delhi (IN)

(72) Inventors: Herbert Coenen, Koenigswinter (DE); L. Manibaskar, Pondicherry (IN)

(73) Assignee: UNIPARTS INDIA LIMITED, New Delhi (IN)

( * ) Notice: Subject to any disclaimer, the term of this patent is extended or adjusted under 35 U.S.C. 154(b) by 702 days.

(21) Appl. No.: 17/924,831

(22) PCT Filed: Feb. 17, 2021

(86) PCT No.: PCT/IN2021/050149
§ 371 (c)(1),
(2) Date: Nov. 11, 2022

(87) PCT Pub. No.: WO2021/229594
PCT Pub. Date: Nov. 18, 2021

(65) Prior Publication Data
US 2023/0276725 A1      Sep. 7, 2023

(30) Foreign Application Priority Data
May 14, 2020    (IN) .............................. 202011020388

(51) Int. Cl.
*A01B 59/00*        (2006.01)
*A01B 59/06*        (2006.01)
(52) U.S. Cl.
CPC .......... *A01B 59/006* (2013.01); *A01B 59/066* (2013.01); *A01B 59/064* (2013.01)

(58) Field of Classification Search
CPC ... A01B 59/006; A01B 59/066; A01B 59/064; A01B 59/043; B60D 1/04
See application file for complete search history.

(56) References Cited

U.S. PATENT DOCUMENTS 4,014,562 A * 3/1977 Kunze .................. A01B 59/006
                                                  280/509
5,050,684 A * 9/1991 Vollmer ................ F16B 45/026
                                                  414/703

(Continued)

FOREIGN PATENT DOCUMENTS

CN          101305651  A      11/2008
DE     202010016051  U1 *   3/2012    ............... B60D 1/28
EP         1990220  A1 *   11/2008    ............... B60D 1/04

*Primary Examiner* — Christopher J Sebesta
*Assistant Examiner* — Blake E Scoville
(74) *Attorney, Agent, or Firm* — BakerHostetler

(57)              ABSTRACT

A coupling device is disclosed which is designed as a hook with a hook body, an opening that allows the mating part of the attachment to enter the hook body, a guideway and a shoulder to counter any offset between the mating part of the attachment to the hook. Furthermore, the coupling device includes a locking latch that protrudes into the opening of the hook body and locks the mating part of the attachment in order to engage the mating part with the hook body, thereby retaining the mating part in a locked position. In an embodiment, the locking latch has a geometry that limits the motion of the locking latch and generates a motion curve. Furthermore, the locking latch moves on a motion curve to allow the locking latch to release the opening in order to allow the mating part to enter the socket.

3 Claims, 9 Drawing Sheets

(56)　　　　　　References Cited

U.S. PATENT DOCUMENTS

| 11,186,129 | B1 * | 11/2021 | McCurter | ................ | B60D 1/28 |
| 11,318,801 | B1 * | 5/2022 | McCurter | ................ | B60D 1/62 |
| 2006/0005977 | A1 * | 1/2006 | Yamada | ............... | A01B 59/006 |
| | | | | | 172/677 |

* cited by examiner

LOWER LINK HOOK

CROSS REFERENCE TO RELATED APPLICATION

This application is a National Stage Application of International Patent Application No. PCT/IN2021/050149, filed Feb. 17, 2021, which claims priority to Indian Patent Application number 202011020388, filed May 14, 2020, the entire disclosures of both of which are hereby incorporated by reference as if set forth in their entirety herein.

FIELD OF THE INVENTION

The present invention is related to the field of attachment mechanisms for tractors, in particular, to a device and a method that allows automatic coupling of the workable attachments to a three-point linkage of a tractor without any activation to simplify the operation significantly.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Farming devices have undergone tremendous technological advancements in the recent years, especially in the case of most common farming devices such as tractors, which are used for attaching a trailer or any other utility equipment that is commonly utilized in agriculture. Mostly, tractors are designed with a three-point linkage assembly for connecting a workable attachment to the tractor. In conditions where there is a requirement for the workable attachment to be attached with the three-point linkage of the tractor, a workable attachment assembly is introduced that includes three mounting sections that are used to engage the workable attachment to the tractor.

However, designing a three-point linkage assembly that is appropriate for a variety of workable attachments may result in a surge in research and inventory expenditure. Furthermore, there is no system or method that is currently available in the market that can remotely couple the three-point linkage assembly with the workable attachment, for example, remotely couple the components from the operator station. In view of the above, there is a need for a device and a method that allows automatic coupling of the workable attachments with the three-point linkage of the tractor without any activation and simplifies the operation significantly.

SUMMARY OF THE INVENTION

It is intended that all such features, and advantages be included within this description, be within the scope of the present invention, and be protected by the accompanying claims. The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

The object of the present invention is to provide a device and a method that allows automatic coupling of the workable attachments with the three-point linkage of the tractor without any activation and simplifies the operation significantly.

A coupling device is disclosed which is designed as a hook with a hook body, an opening that allows the mating part of the attachment to enter the hook body, a guideway and a shoulder to counter any offset between the mating part of the attachment to the hook. Furthermore, the coupling device includes a locking latch that protrudes into the opening of the hook body and locks the mating part of the attachment in order to engage the mating part with the hook body, thereby retaining the mating part in a locked position. In an embodiment, the locking latch has a geometry that limits the motion of the locking latch and generates a motion curve. Furthermore, the locking latch moves on a motion curve to allow the locking latch to release the opening in order to allow the mating part to enter the socket.

The coupling device is further equipped with an actuation lever connected with the locking latch. The actuation lever allows to disengage the locking latch from the mating part in order to release the mating part and to disconnect the attachment from the tractor by moving the actuation lever from an initial position to a final position. The actuation lever and hook body are equipped with a resting position, at which the actuation lever keeps the locking latch in a disengaged condition. The hook body is equipped with a hole to allow the operator entering a safety device to permanently lock the coupling device for the time the operator wants to avoid any activation of the actuation lever, which leads to disengagement of the attachment.

BRIEF DESCRIPTION OF DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 1A-1C describe different aspects of the three point linkage assembly for the tractor, wherein FIGS. 1A-1B illustrates the three point system in detail and the FIG. 1C illustrates the lower link with a coupling device.

DESCRIPTION OF THE INVENTION

The aim of the present invention is to provide a device and a method that allows automatic coupling of the workable attachments with the three-point linkage of the tractor without any activation and simplifies the operation significantly. The above aim has been achieved through improved three-point linkage attachment which can be remotely used to attach a mating part of an attachment.

The foregoing advantages as well as the particular construction of the lower link with a hook or coupling device will become more noticeable and understandable from the following detail description thereof when read in conjunction with the accompanying drawings.

Figure 1A:
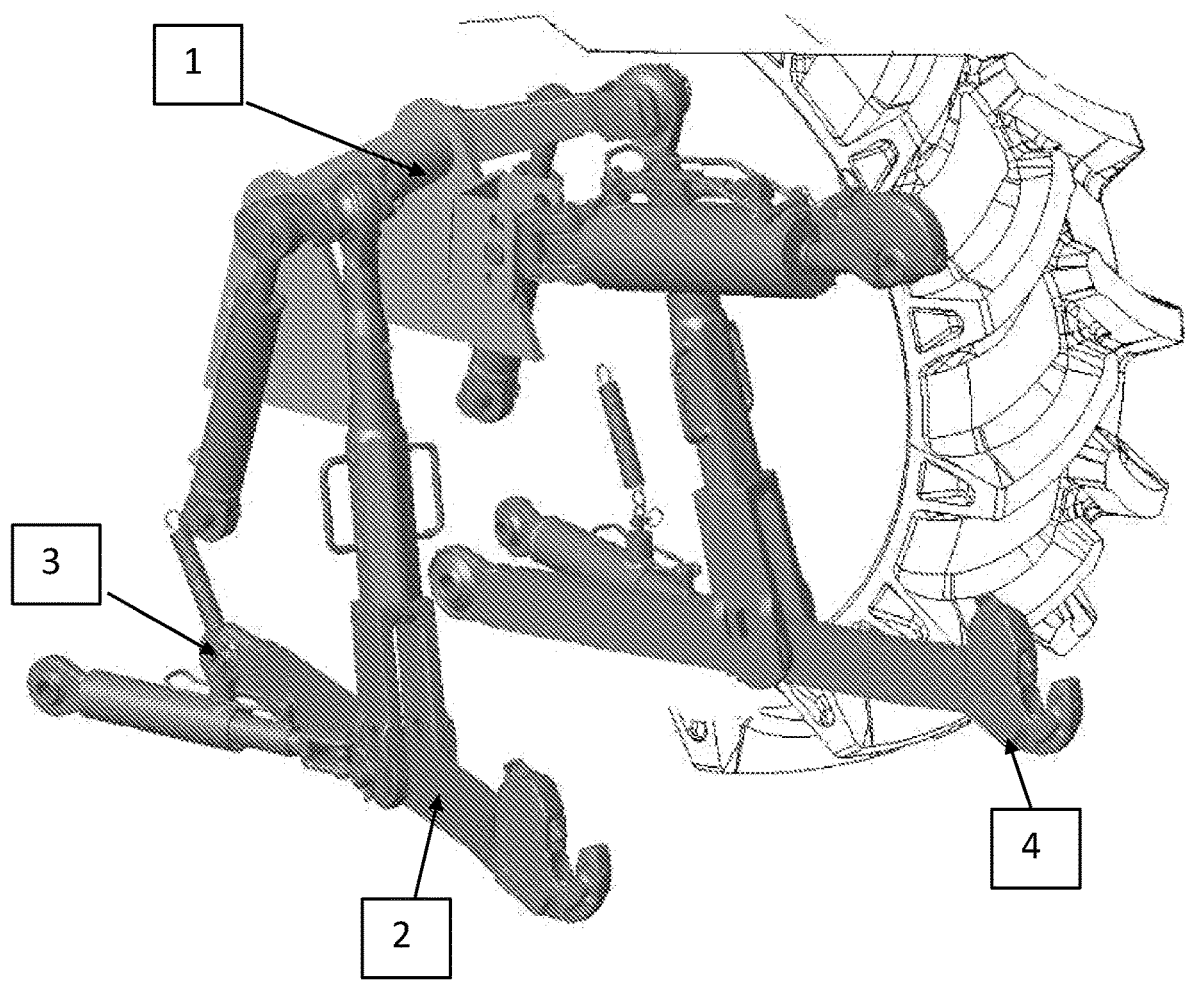
Figure 1B:
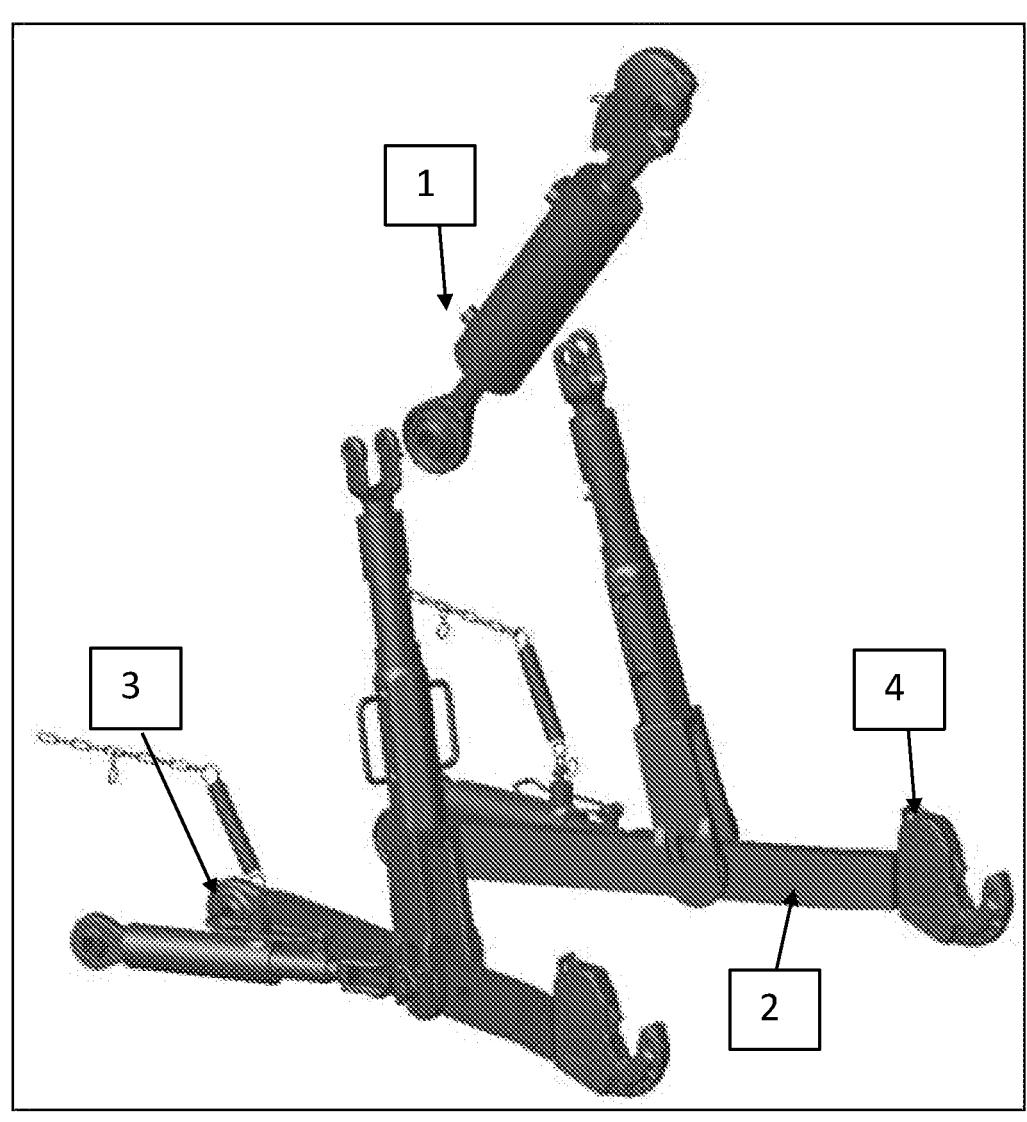
Figure 1C:
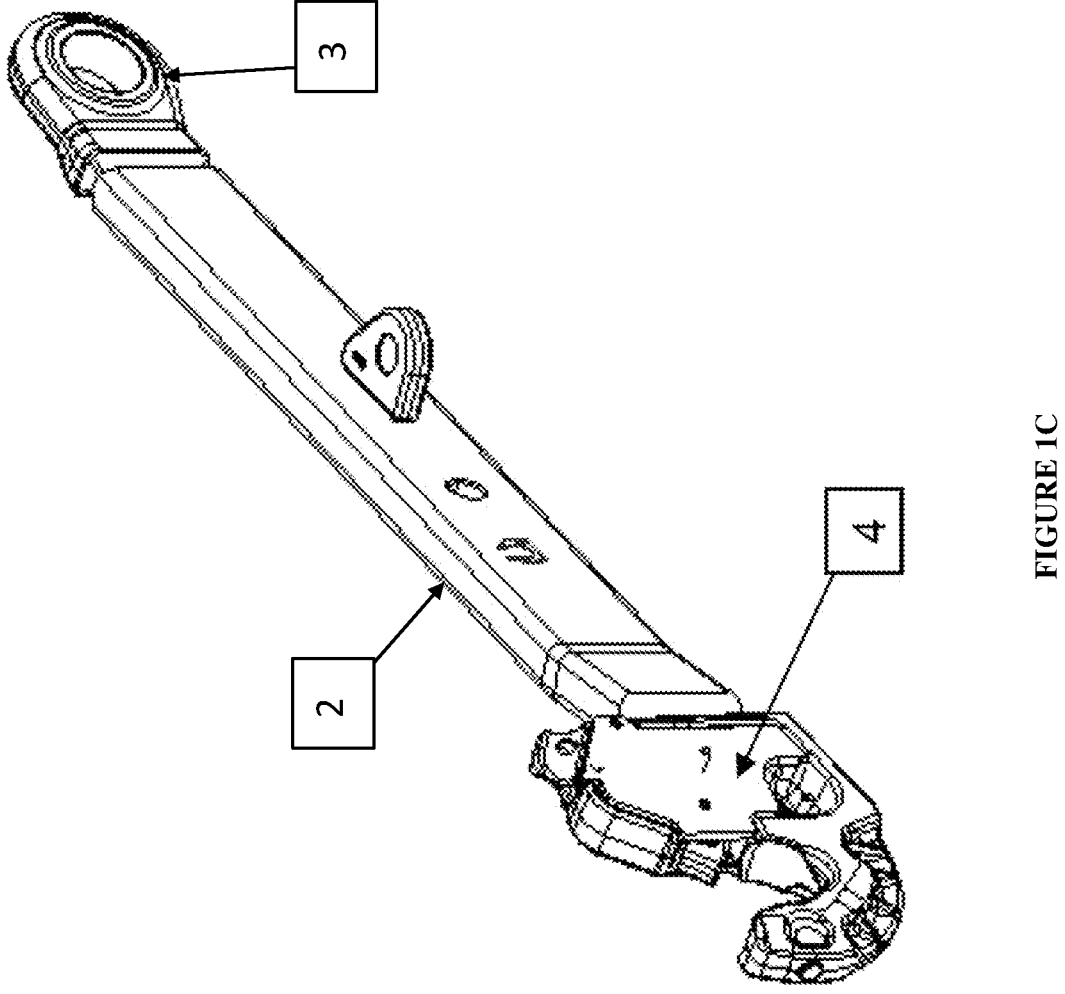

FIGS. 1A-IC describe different aspects of the three-point linkage assembly for the tractor 1, wherein FIGS. 1A-1B illustrates the three-point system in detail and the Figure. 1C illustrates the lower link 2 with a coupling device 4. Tractor 1 that is used in farm applications is equipped with a 3-point linkage system at the rear of the tractor 1 and optionally at the front of the tractor 1 to connect or couple an attachment to the tractor 1. The 3-point systems include lower links 2 that has been connected with a joint 3 to the tractor 1 and a coupling device 4 to enable an attachment being connected to the tractor 1. The coupling device 4 is activated and operated by a cable or any other mode of activating to enable operation of the coupling device 4 from the operator station or any remote location by the operator. The coupling device 4 allows automatic coupling of an attachment without any activation and simplifies the operation significantly.

Figure 2:
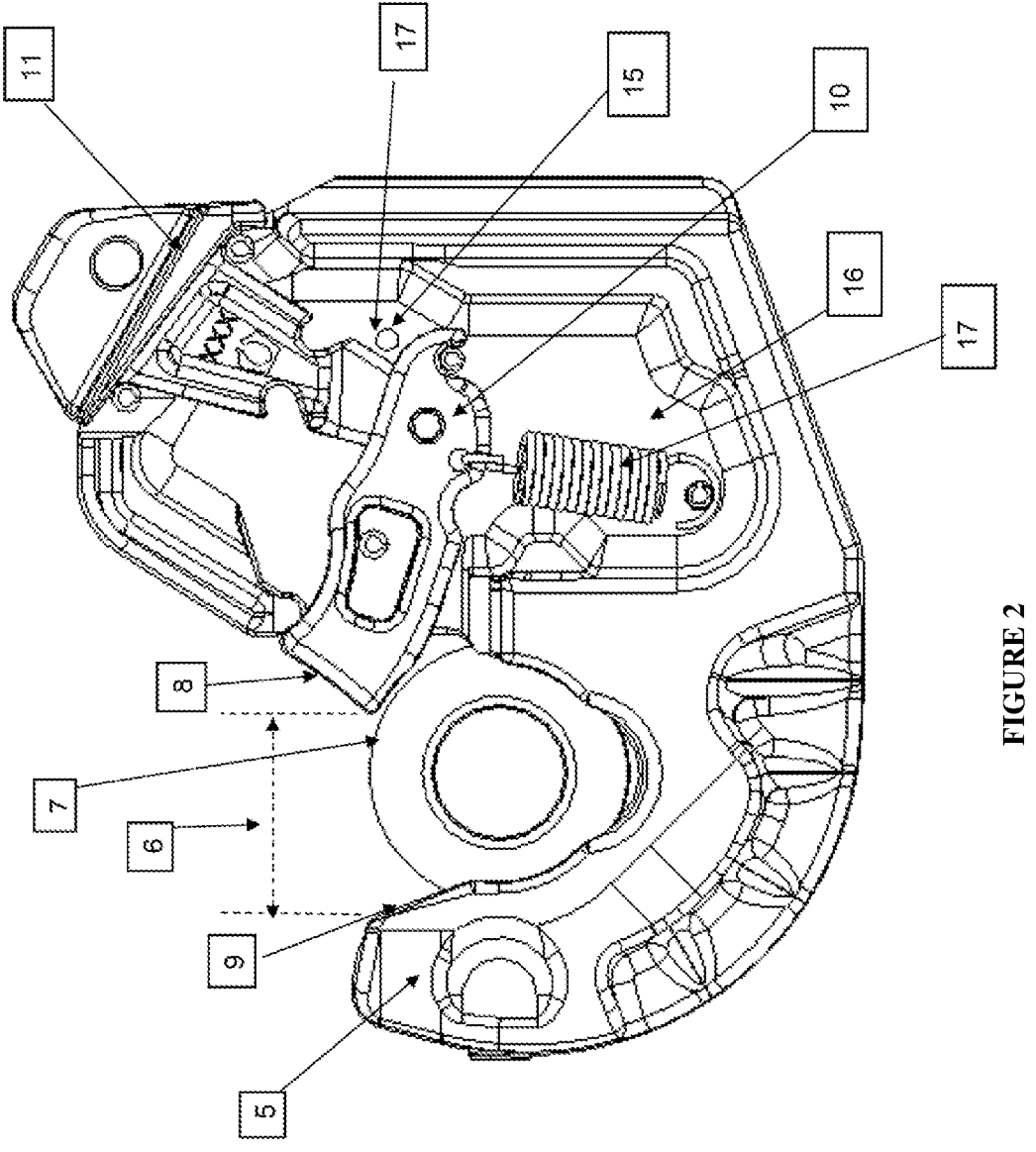
FIG. 2 illustrates the different components of the coupling device or the book.

FIG. 2 illustrates the different components of the coupling device 4 or the book. The coupling device 4 is designed as a hook with a hook body 5, an opening 6 defined on the hook body 5 that allows the mating part 7 of the attachment to enter the hook body 5, a guideway 8 and a shoulder 9 positioned at distal ends of the opening 6 to counter any offset between the mating part 7 of the attachment to the coupling device 4. Furthermore, the coupling device 4 includes a locking latch 10 that protrudes into the opening 6 of the book body 5 and locks the mating part 7 of the attachment in order to engage the mating part 7 with the hook body 5, thereby retaining the mating part 7 in a locked position. In an embodiment, the locking latch 10 has a geometry that limits the motion of the locking latch 10 and generates a motion curve. Furthermore, the locking latch 10 moves on the motion curve to allow the locking latch 10 to release an opening in order to allow the mating part 7 to enter the socket. Latch 10 and lever 11 are mechanical components that allow the temporary joining of parts that are moving relative to each other.

Latch 10 is always in floating conditions with pivotal 19 and has unique motions carve to lock the mating part 7 in one position and allows mating parts 7 that are moving relative to each other the degrees of freedom with respect to centre point 19 of hook body 5 and latch 10.

Figure 3A:
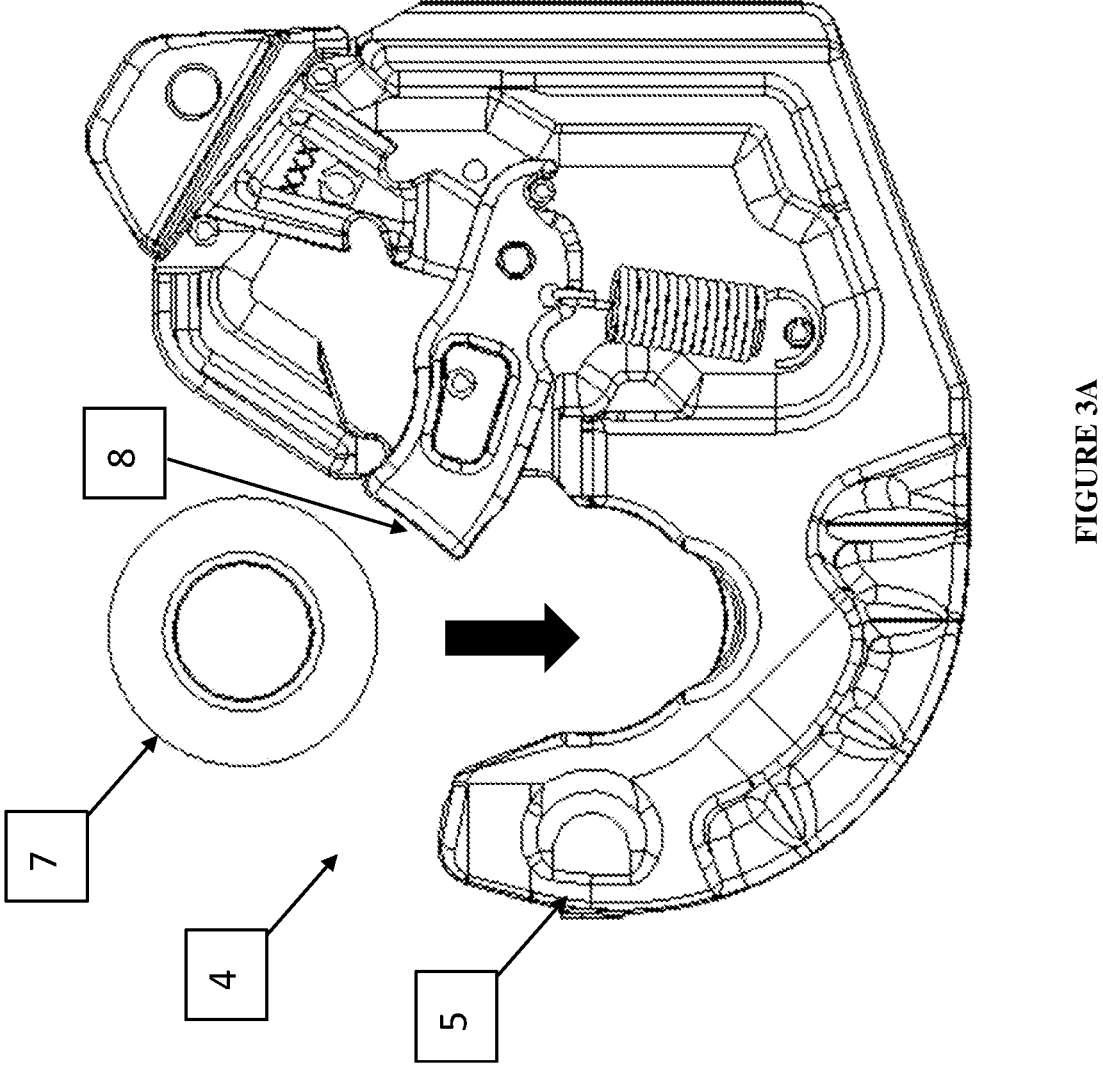
FIGS. 3A and 3B illustrate the coupling device being disengaged and engaged respectively, with the mating part of the attachment.
Figure 3B:
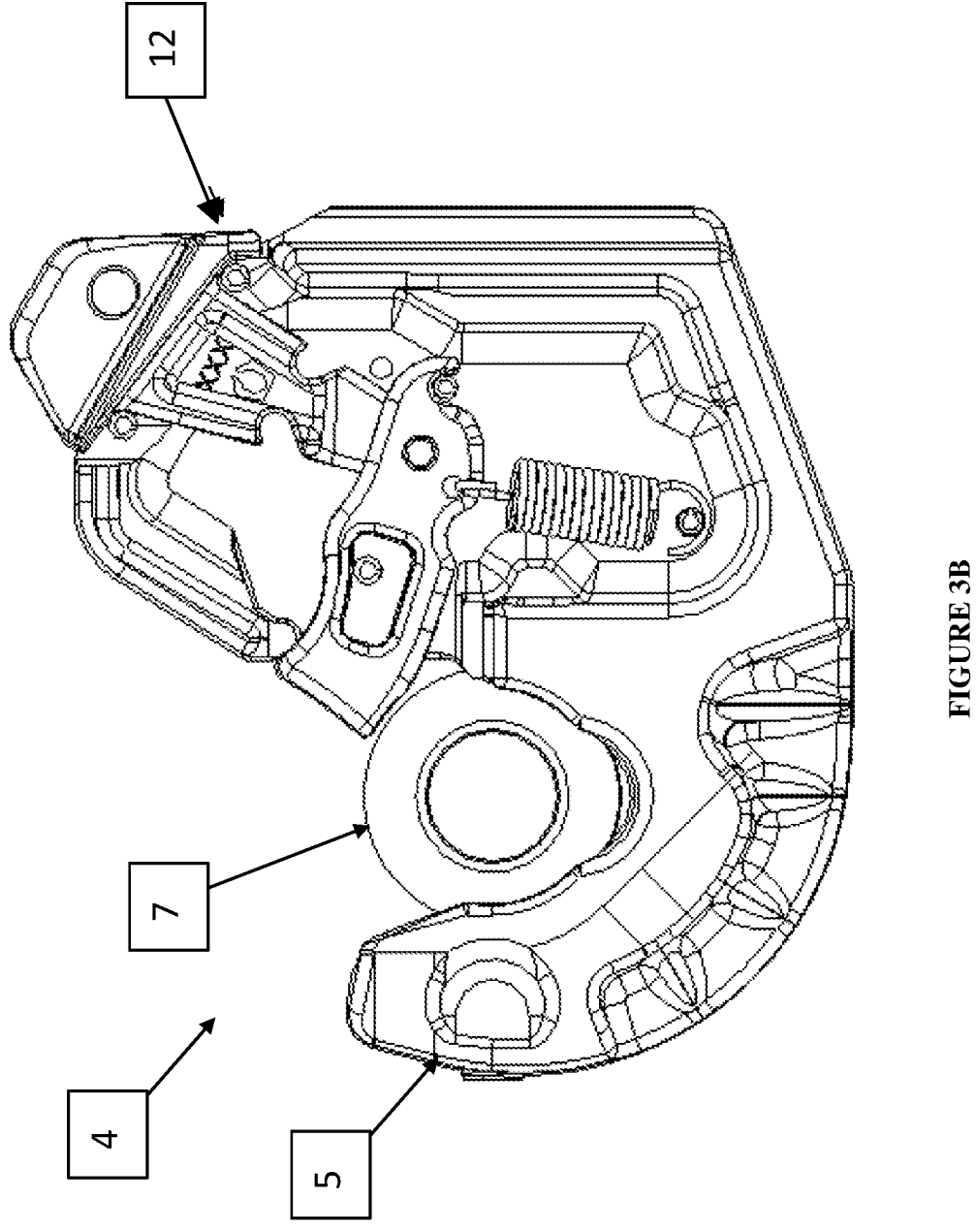

The coupling device 4 is further equipped with an actuation lever 11 connected with the locking latch 10. The actuation lever 11 allows to disengage the locking latch 10 from the mating part 7 in order to release the mating part 7 and to disconnect the attachment from the tractor 1 by moving the actuation lever 11 from a first position 12 to a second position 13A or 13B, as shown in FIGS. 3A, 3B, 4A and 4B. FIGS. 3A and 3B illustrate the coupling device being disengaged and engaged respectively, with the mating part of the attachment.

Figure 4A:
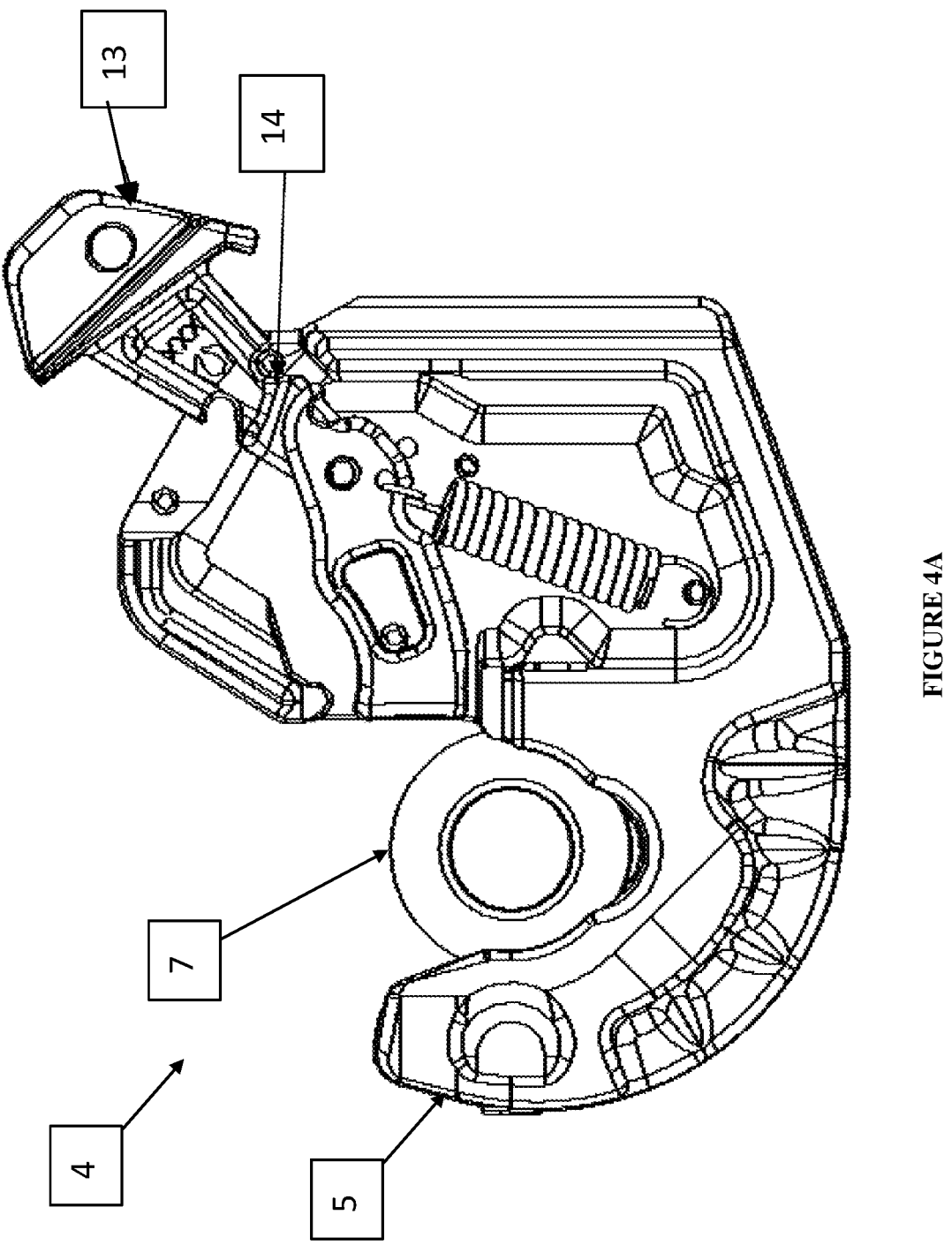
FIGS. 4A and 4B illustrate a first kick down condition and a second kick down condition respectively, of the coupling device.
Figure 4B:
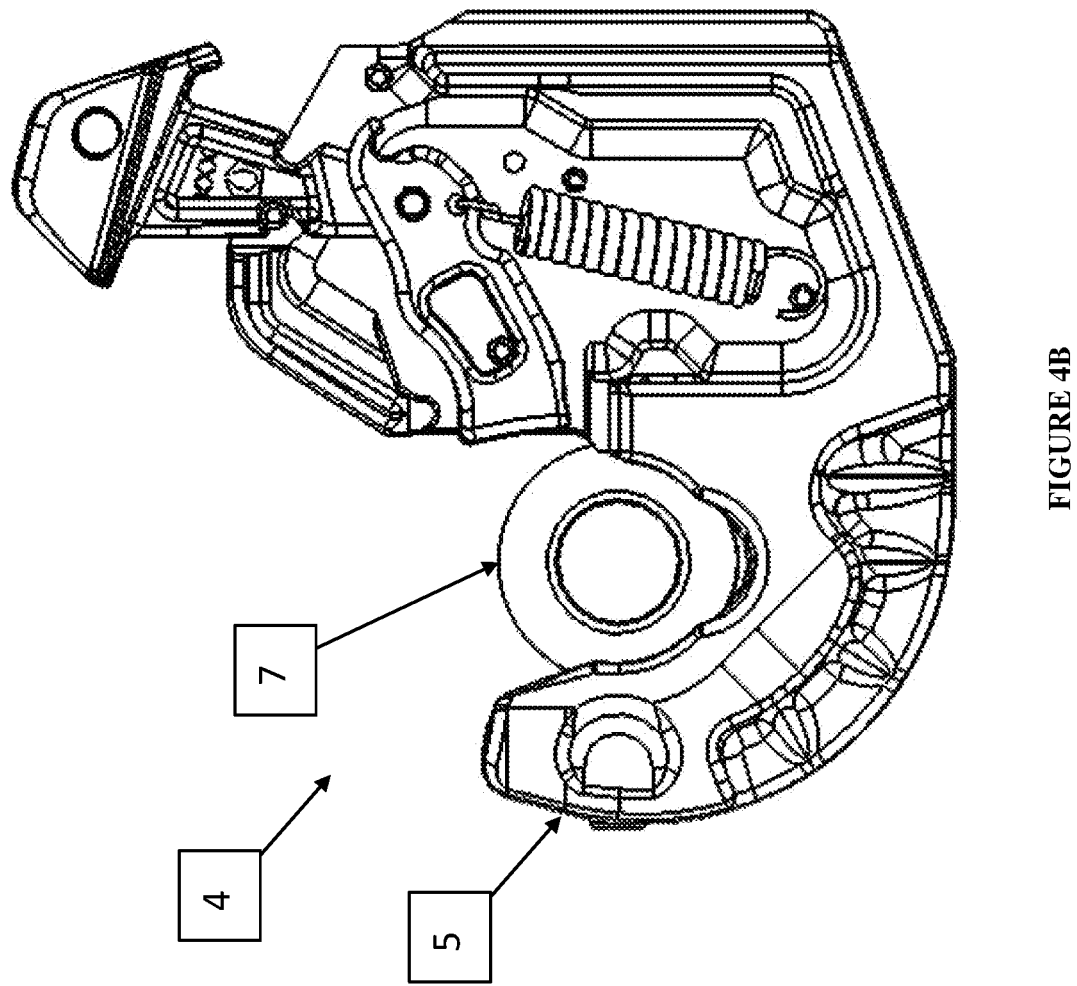

FIGS. 4A and 4B illustrate a first kick down condition and a second kick down condition respectively, of the coupling device.

Figure 5:
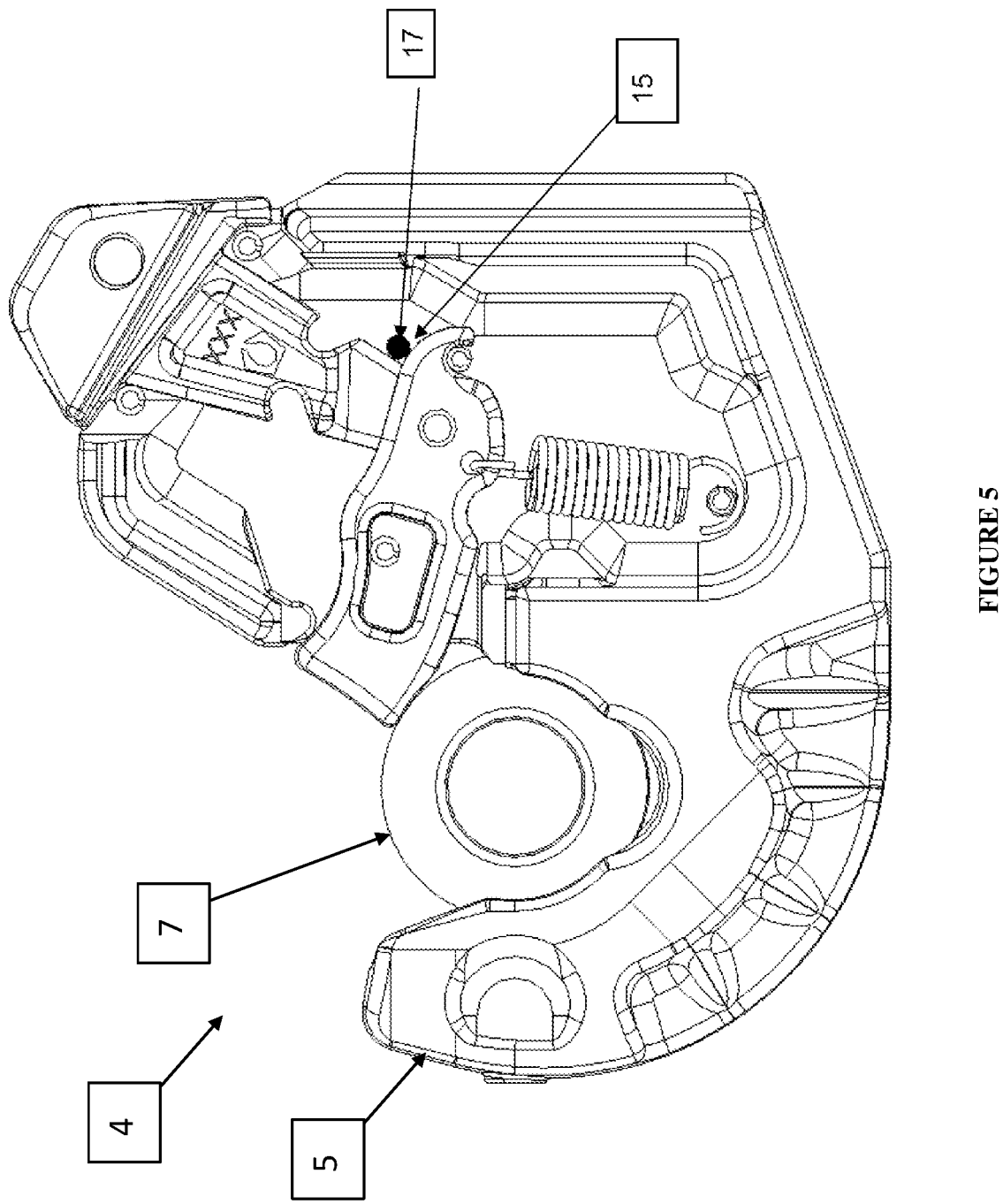
FIG. 5 illustrates a safety locking condition of the coupling device.

The actuation lever 11 and hook body 5 are oriented with a resting position 14A and 14B, as shown in FIGS. 4A and 4B respectively, at which the actuation lever 11 keeps the locking latch 10 in a disengaged condition. As shown in FIG. 5, the hook body 5 is equipped with a bole 15 to allow the operator entering a safety device 17 to permanently lock the coupling device 4 for the time the operator wants to avoid any activation of the actuation lever 11, which could lead to disengagement of the attachment.

In other words, the locking latch 10 has a geometry that creates a safety lock to prevent the mating from disengagement without activation by the actuation lever 11. The locking latch 10 moves on the motion curve so that the locking latch 10 would interfere with the mating part 7 that's been engaged. The hook body 5 is designed in a manner that it has an opening or a hole to allow dirt, water, entering the hook body 16 to exit. The coupling device 4 is equipped with an elastic safety device 18 that is connected directly or indirectly to the locking latch 10, as shown in FIG. 5. Hence, such an arrangement of the components in the coupling device 4 allows automatic coupling of the attachment without any activation and simplifies the operation significantly.

Although specific embodiments of the invention have been exemplified and described, it will be apparent to those skilled in the art that alterations and modifications may be performed without departing from the invention in its broader scope, and therefore, the appended claims are to encompass within their scope all alterations, modifications and equivalents that fall within the actual scope of the invention.

We claim:

1. A coupling device comprising:
a hook body including a shoulder and an inner surface;
an opening defined between the shoulder and a guideway of a locking latch, wherein the opening is configured to receive a mating part of an attachment to engage with the inner surface of the hook body, and wherein the guideway and the shoulder are positioned at distal ends of the opening;
the locking latch that protrudes into the opening, wherein in a locked position the locking latch is configured to engage and lock the mating part of the attachment with the inner surface of the hook body, and wherein in an unlocked position the locking latch is configured to allow movement of the mating part relative to the hook body;
an actuation lever connected to locking latch, the actuation lever being movable from a first position to a second position to allow disengagement of the locking latch from the mating part in order to release the mating part and to disconnect the attachment wherein the actuation lever and the book body define a resting position such that the actuation lever maintains the locking latch in a disengaged condition; and
a safety device coupled to the locking latch, wherein the safety device includes a portion extending beyond the inner surface of the hook body towards a base of the coupling device.

2. The coupling device as claimed in claim 1, wherein the hook body comprises a hole to allow the operator to enter the safety device to permanently lock the coupling device for the time the operator wants to avoid activation of the actuation lever, and to avoid disengagement of the attachment.

3. The coupling device as claimed in claim 1, wherein the safety device is elastic, and is connected directly to the locking latch.

* * * * *